United States Patent
Minster et al.

(10) Patent No.: US 10,319,157 B2
(45) Date of Patent: Jun. 11, 2019

(54) SYSTEM AND METHOD FOR AUTOMATIC MAINTENANCE

(71) Applicant: GM GLOBAL TECHNOLOGY OPERATIONS LLC, Detroit, MI (US)

(72) Inventors: Gautier Minster, San Francisco, CA (US); Solomon Bier, San Francisco, CA (US); Matthias Wisniowski, San Francisco, CA (US)

(73) Assignee: GM GLOBAL TECHNOLOGY OPERATIONS LLC, Detroit ( * ) Notice: Subject to any disclaimer, the term of this patent is extended or adjusted under 35 U.S.C. 154(b) by 128 days.

(21) Appl. No.: 15/465,079

(22) Filed: Mar. 21, 2017

(65) Prior Publication Data

US 2017/0278312 A1    Sep. 28, 2017

Related U.S. Application Data (60) Provisional application No. 62/311,691, filed on Mar. 22, 2016.

(51) Int. Cl.
| | |
|---|---|
| *G07C 5/00* | (2006.01) |
| *G05D 1/02* | (2006.01) |
| *G06Q 10/00* | (2012.01) |

(52) U.S. Cl.
CPC ........... *G07C 5/006* (2013.01); *G05D 1/0297* (2013.01); *G06Q 10/00* (2013.01); *G05D 2201/0213* (2013.01); *G07C 5/008* (2013.01)

(58) Field of Classification Search
CPC ...... G07C 5/006; G07C 5/008; G05D 1/0297; G05D 2201/0213; G05D 1/0044; G05D 1/0214; G05D 1/0088; G06Q 10/1095; G06Q 10/083; B62D 15/02; H04L 67/142; B60R 25/24; B60L 11/1822; H05B 37/0272

See application file for complete search history.

(56) References Cited

U.S. PATENT DOCUMENTS

| | | | |
|---|---|---|---|
| 9,507,346 B1 * | 11/2016 | Levinson | G05D 1/0214 |
| 9,552,564 B1 * | 1/2017 | Martenis | G06Q 10/083 |
| 9,907,147 B2 * | 2/2018 | Chen | H05B 37/0272 |
| 2017/0267233 A1 * | 9/2017 | Minster | B62D 15/02 |

(Continued)

OTHER PUBLICATIONS

Aiding et al., Driver associate, 2004, IEEE, p. 401-407 (Year: 2004).*

(Continued)

*Primary Examiner* — Mcdieunel Marc
(74) *Attorney, Agent, or Firm* — Lorenz & Kopf LLP (57) ABSTRACT

Systems and methods for automatic maintenance of an autonomous vehicle include: identifying a maintenance requirement for an autonomous vehicle, wherein identifying a maintenance requirement includes using one or more sensors to obtain vehicle maintenance data; in response to identifying the maintenance requirement, generating a maintenance request comprising a description or data relating to the maintenance requirement; transmitting the maintenance request; receiving maintenance instructions comprising maintenance routing instructions and a maintenance schedule for a maintenance session for resolving the maintenance requirement; and implementing the maintenance instructions.

20 Claims, 5 Drawing Sheets

(56) References Cited

U.S. PATENT DOCUMENTS

| | | | | |
|---|---|---|---|---|
| 2017/0324817 A1* | 11/2017 | Oliveira | ............... | H04L 67/142 |
| 2017/0364869 A1* | 12/2017 | Tarte | ............... | G06Q 10/1095 |
| 2018/0012198 A1* | 1/2018 | Ricci | ............... | B60L 11/1822 |
| 2018/0118164 A1* | 5/2018 | Wood | ............... | B60R 25/24 |
| 2018/0136651 A1* | 5/2018 | Levinson | ............ | G05D 1/0044 |
| 2018/0210457 A1* | 7/2018 | Smartt | ............... | G05D 1/0088 |
| 2018/0211545 A1* | 7/2018 | Smartt | ............... | G05D 1/0088 |
| 2018/0211546 A1* | 7/2018 | Smartt | ............... | G05D 1/0088 |

OTHER PUBLICATIONS

Yang et al., Use of MOBITEX wireless wide area networks as a solution to land-based positioning and navigation, 1994, IEEE, p. 91-98 (Year: 1994).*

Jiau et al., Multimedia Services in Cloud-Based Vehicular Networks, 2015, IEEE, p. 62-79 (Year: 2015).*

Meneguette et al., SMART: An Efficient Resource Search and Management Scheme for Vehicular Cloud-Connected System< 2016, IEEE, p. 1-6 (Year: 2016).*

* cited by examiner

SYSTEM AND METHOD FOR AUTOMATIC MAINTENANCE

CROSS-REFERENCE TO RELATED APPLICATIONS

This application claims the benefit of U.S. Provisional Application Ser. No. 62/311,691, filed on 22 Mar. 2016, which is incorporated in its entirety by this reference.

TECHNICAL FIELD

This invention relates generally to the vehicle automation field, and more specifically to new and useful systems and methods for automatic maintenance.

BACKGROUND

Vehicle automation has been suggested as a solution to this pressing issue almost as long as cars have been in existence—experiments on autonomy in cars have been conducted since at least the 1920s. Only recently, though, has computer technology advanced enough to make true vehicle automation possible.

In addition to improving safety while driving, autonomous vehicles also have the ability to free up substantial amounts of time for vehicle drivers; enabling would-be drivers to utilize their time more efficiently. Still, autonomous vehicles as implemented or designed today are serviced in essentially the same manner as their non-autonomous counterparts, which means that someone (e.g., a vehicle owner) must spend time taking them to be serviced. Likewise, the timing of this servicing may take autonomous vehicles out of commission when they are most needed. These, in turn, put an upper limit on the degree to which autonomous vehicle users or owners can experience the time-saving benefits of autonomous vehicles.

Thus, there is a need in the vehicle automation field to create systems and methods for automatic maintenance. This invention provides such new and useful systems and methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

A primary function of autonomous vehicles is to safely and efficiently move people (or cargo) from one point to another without requiring human intervention. To successfully complete this function, autonomous vehicles must include a set of sensors (to perceive the environment), a set of actuators (to control actions of the autonomous vehicles), and a computer to control the actuators in the response to input received by the sensors and other instructions. In other words, autonomous vehicles must be able to follow transportation instructions while responding appropriately to the dynamic and unpredictable environment of the road.

The same sensing and evaluation capabilities that enable autonomous vehicles to drive safely and efficiently may also be used to enable maintenance on autonomous vehicles to be automatically performed.

1. System for Automatic Maintenance

Figure 1:
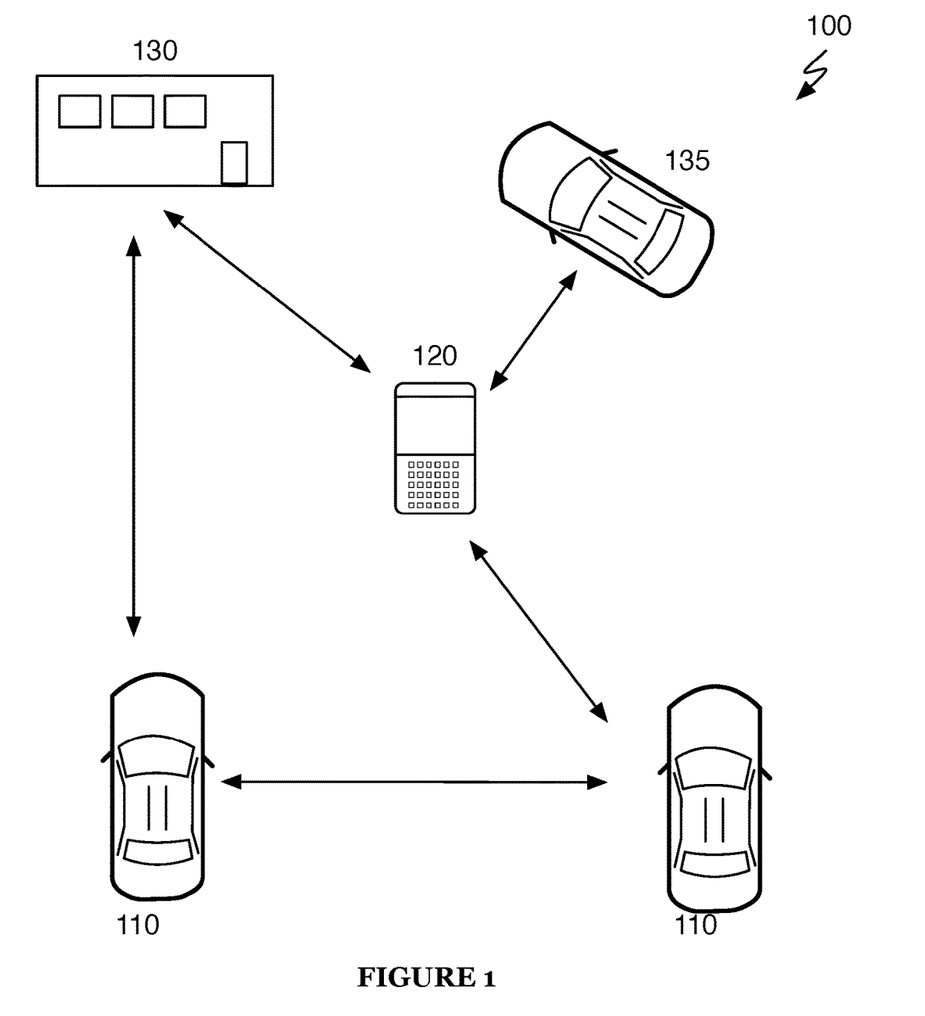
FIG. 1 is a diagram representation of a system of a preferred embodiment.

A system 100 for automatic maintenance of autonomous vehicles includes an autonomous vehicle 110, a maintenance coordinator 120, and at least one of a maintenance station 130 and a maintenance vehicle 135, as shown in FIG. 1.

The system 100 functions to enable maintenance on an autonomous vehicle 110 to be automatically performed by a maintenance station 130 or maintenance vehicle 135. Based on the duty schedules of the autonomous vehicle 110 and the maintaining entity (130/135), a maintenance session may be scheduled by a maintenance coordinator 120 or the like and maintenance may be performed in a manner that reduces disruption to users of the autonomous vehicle and increases utilization of the maintaining entity (130/135). Additionally, or alternatively, the autonomous vehicle 110 may be able to negotiate directly with a maintaining entity (130/135) to schedule a maintenance session without the intervention of a maintenance coordinator 120 or other central maintenance authority.

The system 100 preferably takes advantage of the sensing capabilities of autonomous vehicles 110 and/or of a secondary autonomous vehicle to identify maintenance needs earlier and with higher accuracy than would otherwise be possible. Further, the system 100 preferably utilizes a fleet-wide knowledge (and potentially control) of autonomous vehicle routing by the maintenance coordinator 120 to efficiently schedule maintenance (in both time and space) to reduce disruption to an autonomous vehicle no. For example, the system 100 may delay maintenance scheduling until an autonomous vehicle no is near a maintenance station 130 to perform maintenance or to provide maintenance instructions. As another example, the system 100 may enable a mobile maintenance vehicle 135 to perform maintenance on an autonomous vehicle no where it is charging (at any location) or stationary for a prolonged period of time sufficient to enable a mobile maintenance vehicle 135 or the like to perform maintenance. These are but a few of the myriad ways in which the system 100 may revolutionize autonomous vehicle maintenance.

While the term maintenance is generally understood to encompass any work performed to maintain the functionality and/or appearance of an autonomous vehicle, a person of ordinary skill in the art of autonomous vehicles will recognize that the system 100 is additionally applicable to any work performed in regard to an autonomous vehicle no that requires the use of an external entity (e.g., analogous to the previously mentioned maintaining entities 130/135). For example, the system 100 may be used to respond to a need of an autonomous vehicle passenger for emergency (e.g., police, medical) assistance, or to respond to a need of an electric autonomous vehicle to be charged or have a battery swapped.

The autonomous vehicle 110 is preferably a fully autonomous automobile, but may additionally or alternatively be any semi-autonomous or fully autonomous vehicle; e.g., a boat, an unmanned aerial vehicle, a driverless car, etc.

In addition to a powertrain (or other movement-enabling mechanism), autonomous vehicles no preferably include an onboard computer and a sensor suite (e.g., computer vision system, LIDAR, RADAR, wheel speed sensors, GPS, cameras, etc.). The onboard computer functions to control the autonomous vehicles no and processes sensed data from the sensor suite and/or other sensors in order to determine states of the autonomous vehicles no. Based upon the vehicle state and programmed instructions, the onboard computer preferably modifies or controls behavior of autonomous vehicles no.

The onboard computer is preferably a general-purpose computer adapted for I/O communication with vehicle control systems and sensor systems, but may additionally or alternatively be any suitable computing device.

The onboard computer is preferably connected to the Internet via a wireless connection (e.g., via a cellular data connection). Additionally or alternatively, the onboard computer may be coupled to any number of wireless or wired communication systems.

The sensor suite preferably includes sensors used to perform autonomous vehicle driving and data capture regarding the circumstances surrounding the autonomous vehicle as well as data capture relating to operations of the autonomous vehicle, but may additionally or alternatively include sensors dedicated to detecting maintenance needs of the autonomous vehicle. For example, the sensor suite may include engine diagnostic sensors or an exterior pressure sensor strip. As another example, the sensor suite may include sensors dedicated to identifying maintenance needs related to cleanliness of autonomous vehicle interiors; for example, internal cameras, ammonia sensors, methane sensors, alcohol vapor sensors, etc.

The maintenance coordinator 120 functions to enable maintenance sessions to be scheduled between autonomous vehicles 110 and maintenance stations 130 and/or maintenance vehicles 135.

The maintenance coordinator 120 is preferably a remote server (or distributed computing system) connected to the autonomous vehicles 110 via an internet connection, but may additionally or alternatively be any suitable computing system (e.g., a collection of autonomous vehicle computers working as a distributed computing system or any central governing authority).

The maintenance coordinator 120 preferably may take input from autonomous vehicles 110, maintenance stations 130, maintenance vehicles 135, autonomous vehicle manufacturers, and/or any other source relevant to autonomous vehicle maintenance. For example, the maintenance coordinator 120 may take remote expert input from a remote expert as described in U.S. Provisional Patent Application No. 62/274,577, filed on 4 Jan. 2016, the entirety of which is incorporated by this reference.

In some implementations, the maintenance coordinator may be used to modify or generate routes for autonomous vehicles 110 and/or maintenance vehicles 135 (as described in sections on the method 200). In said implementations, the maintenance coordinator 120 preferably communicates with and/or incorporates functions of the routing coordinator of U.S. Provisional Patent Application No. 62/302,874, the entirety of which is incorporated by this reference. As an example, the maintenance coordinator 120 or the like is capable of generating a maintenance session involving an autonomous vehicle and a mobile maintenance entity where the maintenance session includes a time and maintenance location for the maintenance session. In such example, the maintenance coordinator is capable of generating routing instructions for both the autonomous vehicle and the mobile maintenance entity in order to arrive at the prescribed maintenance location and at the prescribed time for maintenance. Further, in such example, the routing instructions for the autonomous vehicle may include autonomous vehicle controls for controlling the operations and/or driving of the autonomous vehicle to the maintenance location whereas the routing instructions to the mobile maintenance entity may only include route guidance instructions for implementation by a human operator. However, it shall be noted that if the mobile maintenance entity also includes an autonomous vehicle or the like, the routing instructions may similarly include autonomous vehicle controls for controlling the driving operations of the mobile maintenance entity to the prescribed maintenance location.

The maintenance station 130 and the maintenance vehicle 135 (together referred to as the maintenance entities) function to perform maintenance for autonomous vehicles no (as described in sections describing the method 200). Additionally, or alternatively, a maintenance entity may include a remote autonomous vehicle maintenance coordinator that is capable of performing virtual or software-related maintenance of the autonomous vehicle. The maintenance entities may perform any type of maintenance (e.g., replacing engine parts, cleaning vehicle interiors, charging batteries, providing supplemental batteries, performing system updates including software updates, vehicle upgrades, etc.).

The maintenance station 130 and maintenance vehicle 135 are preferably substantially similar, with the exception that the maintenance vehicle 135 is mobile.

The maintenance entities may be partially autonomous, fully autonomous, or not autonomous. For example, a maintenance station 130 may be a standard garage capable of servicing autonomous vehicles, and a maintenance vehicle 135 may be a standard cleaning vehicle capable of transporting human cleaning personnel and cleaning supplies. As another example, a maintenance vehicle 135 may be an autonomous vehicle still carrying human cleaning personnel. As a third example, a maintenance vehicle 135 may be an autonomous vehicle with a cleaning robot, that may automatically clean autonomous vehicles. As a fourth example, a maintenance station 130 may include any location at which a maintenance entity may have access to perform one or more maintenance operations to the autonomous vehicle. In such example, a maintenance location may include a parking space or a designated maintenance parking space at which the autonomous vehicle parks for a sufficient amount of time to have maintenance performed thereon a maintenance entity.

The maintenance entities may contain any sensors (e.g., those described in the section covering the autonomous vehicle 110) used to detect or predict maintenance needs. In some cases, maintenance entities may be solely directed to maintenance need detection; e.g., a maintenance entity may be a camera and/or pressure sensor at an intersection that an autonomous vehicle 110 may drive by to perform maintenance need detection. In such instances, the maintenance entity is capable of observing and capturing data relating to a behavior of autonomous vehicles and/or capture data related to external appearance of the autonomous vehicle.

The maintenance station 130 and maintenance vehicle 135 are preferably any maintenance entities capable of performing maintenance as described in the method 200 description, but may additionally or alternatively be any entities capable of performing autonomous vehicle maintenance.

2. Method for Automatic Maintenance

Figure 2:
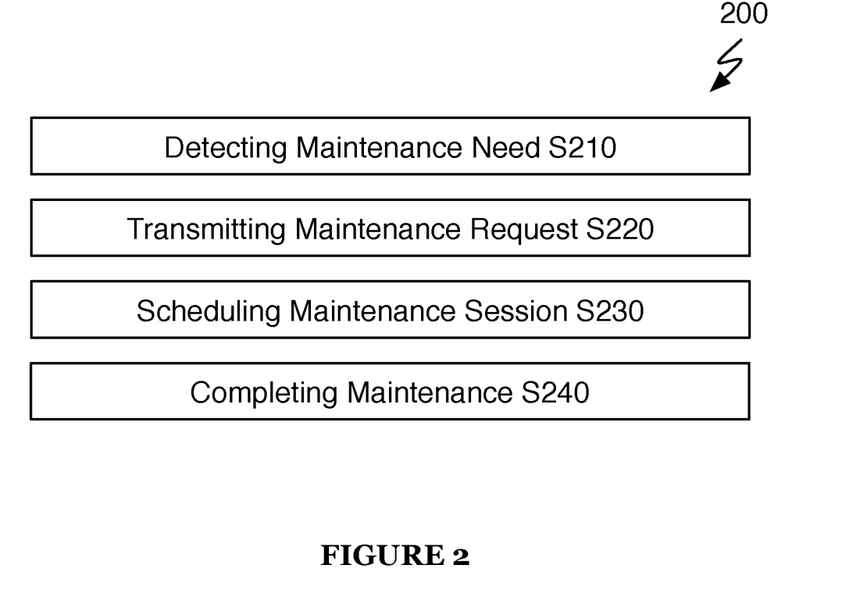
FIG. 2 is a chart view of a method of a preferred embodiment.

A method 200 for automatic maintenance of an autonomous vehicle includes one or more of detecting a maintenance need S210, transmitting a maintenance request S220, scheduling a maintenance session S230, and completing maintenance S240, as shown in FIG. 2. The method 200 may include any set or subset of S210, S220, S230, and S240. For instance, the method 200 may include a subset step S235 for generating maintenance routing instructions for an autonomous vehicle and/or a mobile maintenance entity.

A primary function of autonomous vehicles is to safely and efficiently move people (or cargo) from one point to another without requiring human intervention. To successfully complete this function, autonomous vehicles must include a set of sensors (to perceive the environment) or have access to a set of sensors, a set of actuators (to control actions of the autonomous vehicles), and a computer to control the actuators in response to input received by the sensors and other instructions. In other words, autonomous vehicles must be able to follow transportation instructions while responding appropriately to the dynamic and unpredictable environment of the road. Accordingly, proper maintenance of the autonomous vehicle, as well as the set of sensors available to the autonomous vehicle is required to enable the autonomous vehicle to responsively and safely follow transportation instructions.

The same or similar sensing and evaluation capabilities that enable autonomous vehicles to drive safely and efficiently may also be used to enable maintenance on autonomous vehicles to be automatically performed. That is, maintenance diagnostic functions may be performed by the autonomous vehicle or other autonomous vehicle or entity without human intervention.

The method 200 functions to enable the need for maintenance for an autonomous vehicle to be detected (S210), resulting in generation and transmission of a maintenance request (S220) to a maintaining entity capable of assisting in and/or performing autonomous vehicle maintenance. Based on the duty schedules of the autonomous vehicle and the maintaining entity, a maintenance session may be scheduled (S230) and maintenance may be performed (S240) in a manner that reduces disruption to users of the autonomous vehicle, increases utilization of the maintaining entity, and/ or may reduce cost of operating an autonomous vehicle. Routing instructions may be generated (S235) may be generated that enable an efficient coordination of the maintenance session at a location that is suitable and convenient for the maintaining entity and, especially, the autonomous vehicle.

The method 200 preferably takes advantage of the sensing capabilities of autonomous vehicles to identify maintenance needs earlier and with higher accuracy than would otherwise be possible with external diagnostic tools or the like. Further, the method 200 preferably utilizes a fleet-wide knowledge (and potentially control) of autonomous vehicle routing to efficiently schedule maintenance (in both time and space) to reduce disruption to an autonomous vehicle. For example, the method 200 may delay maintenance until an autonomous vehicle is near a maintenance station to perform maintenance. As another example, the method 200 may enable a mobile maintenance entity to perform maintenance on an autonomous vehicle where it is charging (at any location) and/or parking. These are but a few of the myriad ways in which the method 200 may revolutionize autonomous vehicle maintenance.

The method 200 is preferably implemented by the system 100, but may additionally or alternatively be implemented by any system that includes an autonomous vehicle.

As with the system 100, while the term maintenance is generally understood to encompass any work performed to maintain the functionality and/or appearance of an autonomous vehicle, a person of ordinary skill in the art of autonomous vehicles will recognize that the method 200 is additionally applicable to any work performed in regard to an autonomous vehicle that requires the use of an external entity (analogous to the previously mentioned maintaining entity). For example, the method 200 may be used to respond to a need of an autonomous vehicle passenger for emergency (e.g., police, medical) assistance, or to respond to a need of an electric autonomous vehicle to be charged or have a battery swapped.

S210 includes detecting a maintenance need and/or a recommended maintenance update. S210 functions to detect the need of an autonomous vehicle for maintenance.

A maintenance need or requirement is preferably a detected need for a maintenance entity to interact with an autonomous vehicle (e.g., to repair or otherwise maintain vehicle systems or appearance), but may additionally or alternatively be any need or desire of an autonomous vehicle that requires or prefers the interaction of an external entity with the autonomous vehicle. Additionally, or alternatively, a maintenance need may not always require an interaction with a maintenance entity. For example, in some embodiments, a maintenance need of the autonomous vehicle may be to a software or application update to one or more of the systems of the autonomous vehicle. In such example, when the autonomous vehicle requires an update to the software that controls its GPS functionality, the autonomous vehicle may send a maintenance request to a remote software update databank or database that is capable of responding to the maintenance request with an update to the GPS software. Thus, in some circumstances, an external maintenance entity is not required to perform maintenance work on the autonomous vehicle, but rather, the autonomous vehicle is able to interact with a passive system such as a software update database or the like that is able to provide a maintenance solution without physically interacting with the autonomous vehicle.

A recommended maintenance update is preferably an update to the autonomous vehicle that is suggested or provided by the manufacturer of the autonomous vehicle or a manufacturer of one or more of the components and/or systems of the autonomous vehicle. In such cases, the recommended maintenance update may include or relate to one or more safety recalls, software patches, or the like that should be applied to the autonomous vehicle to enhance the safety or otherwise, improve a performance and/or operation of the autonomous vehicle. A recommended maintenance update may be communicated to the autonomous vehicle in any manner including via one or more recommended maintenance update feeds to which the autonomous vehicle subscribes or receives information from and/or via the maintenance coordinator. In either case, based on receiving the recommended maintenance update, the autonomous vehicle or maintenance coordinator may generate a maintenance request that includes a request for performing the recommended maintenance update.

Some examples of maintenance needs may include: need for a sensing system of an autonomous vehicle to be repaired, need for an actuator of an autonomous vehicle to be repaired, need for an autonomous vehicle component to be replaced, need for autonomous vehicle fluids to be replenished, need for autonomous vehicle to be cleaned (internally or externally), need for autonomous vehicle GPS time or localization to be recalibrated (e.g., by using another or several other autonomous vehicles to help localize by triangulation), and need to for batteries of an autonomous vehicle to be recharged. For example, it may be detected that an autonomous vehicle sensing component, such as a camera, may be out of focus or alignment and thereby requires recalibration. In such example, the maintenance need for the camera may be detected based on a comparison of an image captured by the camera of the autonomous vehicle and a calibrated image taken at a time earlier than the captured image. When the captured image and the calibration image for the camera do not match or substantially match within a prescribed threshold, a maintenance need may be detected. A similar maintenance detection protocol or scheme may be applied to any of the sensors of the autonomous vehicle whereby a current sensing capability of the sensor is compared to a calibrated sensing capability of the sensor to detected any discrepancies between the two thereby indicating a need for maintenance. Maintenance needs may also include passenger need; e.g., need of a passenger for medical assistance, need of an autonomous vehicle to request police assistance (due to one or more of passenger behavior, environmental conditions, and personal behavior external to the autonomous vehicle).

S210 preferably includes detecting a maintenance need of an autonomous vehicle using sensors of an autonomous vehicle. Maintenance needs may be detected by analyzing data from any autonomous vehicle sensors (or any other data sources of an autonomous vehicle). For example, maintenance needs may be detecting using image data (e.g., from cameras on the exterior or interior of the autonomous vehicle), audio data (e.g., from microphone external or internal to the vehicle), LIDAR/RADAR/SONAR data, ultrasound sensor data, engine sensor data (e.g., oil pressure/temperature), accelerometer data, gyroscope data, IMU data, GPS data, wheel rotational velocity sensor data, and seat weight sensor data (e.g., sensors that determine if a passenger or other heavy object is in a seat). While many of the types of sensor data mentioned in the preceding example may be useful for multiple functions of the autonomous vehicle, S210 may additionally or alternatively include detecting maintenance needs from sensors dedicated to maintenance need detection. For example, S210 may include detecting that an autonomous vehicle may need cleaning using gas sensors located in the interior of the vehicle (which may, for instance, detect the presence of alcohol or ammonia vapors).

S210 may include analyzing autonomous vehicle sensor data in any manner. For example, interior image data may be analyzed to determine the status of a vehicle's interior (e.g., is it clean or dirty? Is it in need of repair?) or the behavior of vehicle passengers (e.g., is a passenger sleeping? Is a passenger participating in an illegal or prohibited activity? Is a passenger in need of medical attention?). In the analysis process, S210 may usually involve comparing current sensed data about the autonomous vehicle to some standard or base data (e.g., calibrated data) taken at time $t_o$ that corresponds to proper calibrated or operational state of a feature, component, and/or characteristic of the autonomous vehicle. Likewise, interior audio data may be analyzed (e.g., via speech recognition software and the like) to determine the content of passenger speech (e.g., is a passenger saying they are in need of medical attention?), emotional character of passenger speech (e.g., does a passenger sound distressed?), and/or any other audio characteristic (e.g., are there loud noises present in the vehicle interior?).

As mentioned above, the analysis in S210 may including comparing normal or base operational or characteristic data of an autonomous vehicle to sensed data (e.g., vehicle maintenance data) of the autonomous vehicle. The normal or base operational data (e.g., sensor data profiles) may include data ranges (e.g., 2-4 cm) or a single set data point (e.g., 3 cm) that describes a normal state or base (e.g., calibrated or the like) state of a feature or component of an autonomous vehicle. When performing the analysis of sensed data for a component, an onboard computer of the autonomous vehicle or the like may compare the sensed to determine whether the sensed data falls within a normal data range or matches a normal data point for the component. If the sensed data from the component falls outside of the normal data range or does not match the normal data point for the component, a potential maintenance need may be computed or detected.

S210 preferably includes analyzing sensor data by evaluating the sensor data using maintenance need detection algorithms and/or by comparing sensor data to known sensor data profiles associated with maintenance needs.

For example, S210 may include comparing tire pressure to a low-tire pressure threshold; if tire pressure falls below this threshold, the tire may need to have air added to the tire. As a second example, S210 may include measuring historical braking pressure needed to bring an autonomous vehicle to stop, and detecting a need for brake maintenance when the pressure required to stop hits a certain threshold.

Evaluation of sensor data may include not only evaluation of current sensor data, but also historical sensor data. For example, S210 may include detecting several low-tire-pressure events (each following a recent tire refill), which may in turn trigger detection that the tire probably has a leak. As another example, S210 may include correlating sensor data with maintenance events across a fleet for vehicles; e.g., rising average fuel consumption may correlate to oxygen sensor failure.

Any sensor data may be used to predict any maintenance need. For example, a combination of LIDAR data and steering angle (e.g., the wheel angle relative to the vehicle chassis) may be used to determine if vehicle steering alignment needs correction (if alignment changes, the steering angle required to hold the car 'straight', as determined by LIDAR or other data, may also change).

S210 may additionally or alternatively include detecting a maintenance need of an autonomous vehicle in any other manner.

As a first example, S210 may include detecting a maintenance need of an autonomous vehicle using sensors of another autonomous vehicle. In this example, S210 may include, at a first autonomous vehicle, detecting that a second autonomous vehicle is in need of service by capturing image data of the second autonomous vehicle's exterior, capturing video data of the second autonomous vehicle's driving behavior, capturing audio data of the second autonomous vehicle (e.g., engine noise), and/or capturing any other sensor data related to the second autonomous vehicle that may be used in maintenance need detection.

In such first example, the second autonomous vehicle may transmit the recorded data to a maintenance coordinator and/or perform some or all the maintenance need determination for the first autonomous vehicle. The maintenance coordinator or the second autonomous vehicle may determine whether the first autonomous vehicle requires maintenance assistance based on comparing the data captured by the second autonomous data to base or reference data about the first autonomous vehicle. For instance, the second autonomous vehicle may capture an image of an exterior of the first autonomous vehicle. The image of the exterior of the first autonomous vehicle may include one or more scratches, dents, or similar damage. The second autonomous vehicle may compare the captured image showing the damage to a base image that was taken at a time earlier or prior to a normal operation period of the first autonomous vehicle. That is, the base image of the first autonomous vehicle may serve as a reference image to determine what damage or defects existed prior to the second autonomous vehicle capturing the image of the exterior of the first autonomous vehicle. Accordingly, the second autonomous vehicle can make a determination of whether there is new damage or maintenance that is required by determining whether there is any new damage, defects, and/or maintenance items in the captured image relative to the base or reference image. An assumption in this example may be that a maintenance coordinator and/or an entity responsible for the autonomous vehicle is aware of any damage to the first autonomous vehicle shown in the base or reference image and thus, maintenance or servicing of the first autonomous vehicle may already be scheduled.

As a second example, S210 may include detecting a maintenance need of an autonomous vehicle via human input. In this example, S210 may include detecting that an autonomous vehicle is in need of service in response to feedback from an autonomous vehicle passenger (e.g., a passenger may submit feedback to an autonomous vehicle or autonomous vehicle service that an autonomous vehicle requires cleaning or is behaving strangely), detecting that an autonomous vehicle is in need of service in response to feedback from a remote expert (e.g., a remote expert may identify that an autonomous vehicle is failing to respond appropriately to control inputs), and/or detecting that an autonomous vehicle is in need of maintenance from any human input (e.g., as indicated by a pedestrian).

S210 may additionally or alternatively use any combination of maintenance need detection techniques to detect a maintenance need. For example, S210 may include using autonomous vehicle sensors to capture an image of the interior of an autonomous vehicle, while a remote expert is used to determined that the interior of the autonomous vehicle is in need of cleaning.

In a variation of a preferred embodiment, S210 includes predicting a maintenance need. S210 preferably includes predicting a maintenance need by analyzing sensor data of the autonomous vehicle and comparing said sensor data to a maintenance need prediction algorithm or database. For example, S210 may include analyzing interior sensor data of an autonomous vehicle to determine that a passenger is nauseated, and predicting that there is a possibility that the passenger may vomit. As a second example, S210 may include analyzing vehicle responsiveness data over time to determine that the vehicle performance systems have degraded and are in need of repair or will need repair at a predicted future time.

The maintenance need prediction algorithm may include various steps that enables an accurate prediction of maintenance needs of an autonomous vehicle. In some embodiments, applying the maintenance need prediction algorithm to vehicle maintenance data (e.g., sensed data) to predict a future maintenance need of the autonomous vehicle may include: identifying from the vehicle maintenance data one or more sensor values associated with a component or system of the autonomous vehicle; identifying or referencing historical operations data of the autonomous vehicle and, more specifically, of the component; identifying a predetermined maintenance schedule (e.g., manufacturers schedule for maintaining components of the vehicle or a predetermined schedule based on historical operations of a fleet of similar autonomous vehicles, etc.) for the component of the autonomous vehicle, wherein the predetermined maintenance schedule for the component identifies one or more component maintenance threshold at which the component should receive maintenance servicing; interpolating (by an onboard computer or maintenance coordinator, etc.), based on the historical operations of the autonomous vehicle and the predetermined maintenance schedule for the component, future sensor values for the component up to at least one of the one or more component maintenance thresholds; identifying an interpolated future sensor value for the component that is nearest or intersects the at least one of the one or more component maintenance thresholds; and identifying a future date or future date range associated with the interpolated future sensor value, wherein generating the predicted future maintenance requirement is based on identifying the future date or the future date range at which the interpolated future sensor value is nearest or intersects the at least one of the one or more component maintenance thresholds.

A more specific example of the interpolation process for the maintenance need prediction algorithm may include capturing several real sensor values (e.g., s1, s2, s3, etc. at times, t1-t3, respectively) for a component of the autonomous vehicle. Then identifying a predetermined maintenance value $s_m$ that should trigger a maintenance request. Based on historical operations data of the component of the autonomous vehicle, the maintenance need prediction algorithm is able to interpolate (e.g., linear interpolation) and/or calculate predicted sensor values ($s_n$) up to and beyond sm. That is, there may be a gap in sensor values between $s_3$ and $s_m$ (e.g., $s_{1-t1}$, $s_{2-t2}$, $s_{3-t3}$, ... $s_{m-tn}$) where the values between $s_3$ and $s_m$ are unknown; however, by implementing the maintenance need prediction algorithm, the unknown or missing sensor values can be predicted or calculated to approximate when a sensor value for the component would arrive at or nearest $s_m$ (e.g., $s_{1-t1}$, $s_{2-t2}$, $s_{3-t3}$, $s_{p4-t4}$, $s_{p5-t5}$, $s_{p6-t6}$, $s_{m-tn}$, wherein $s_{pn-tn}$ are interpolated values). The maintenance need prediction algorithm may then identify the nearest interpolated value (e.g., $s_{p6-t6}$) to $s_m$-$t_n$ to approximate a date and/or time, $t_n$, that the sensor values for the component may arrive at the schedule maintenance value, $s_m$. The value $t_6$ or a further calculated value for $t_n$ may then be used (e.g., $t_6 \approx t_n$) as an approximation for a future date at which maintenance may be required for the component of the autonomous vehicle.

In this variation, if a maintenance need is predicted (e.g., predicted and not yet realized) the method 200 may include responding to the predicted maintenance need. For example, S210 may include stopping an autonomous vehicle or otherwise modifying driving behavior of the vehicle in response to detection of a nauseated passenger, and such driving behavior may be modified as described in U.S. Provisional Patent Application No. 62/308,719, filed on 15 Mar. 2016, the entirety of which is incorporated by this reference. As another example, S210 may include detecting that a child passenger of an autonomous vehicle may have to use the restroom (e.g., by detecting that the child is squirming) and notifying other passengers of the vehicle (e.g., an adult responsible for the child) so that the other passengers may respond to the situation.

S210 may additionally or alternatively include calculating maintenance need severity and/or priority. For example, S210 may include generating a severity score for a detected maintenance need that may be interpreted (e.g., by a maintenance entity) to determine how soon a maintenance need may need to be addressed. As another example, a severity level may be identifying and/or selected from among a plurality of severity levels along maintenance severity continuum. The maintenance severity continuum may include severity levels ranging from low severity, intermediate severity, high severity, urgent severity, and the like, for example. At the low severity end of the maintenance severity spectrum, the low severity may be associated with a low priority score (e.g., 1-2, etc. on a scale of 1-10) and increases, such that an urgent severity level may be associated with a high priority score (e.g., 9-10, etc. on a scale of 1-10). In this way, once a severity level is identified, a corresponding priority score may also be identified for the purposes of prioritizing the scheduling of a maintenance session for the autonomous vehicle, as well as for dispatching additional resources, such as a replacement or substitute autonomous vehicle. In determining a severity of a maintenance need, the autonomous vehicle or decisioning device may have reference to a severity database or the like that corresponds error codes, maintenance codes, or maintenance needs to proposed severity levels. Accordingly, by comparing the vehicle maintenance data (e.g., sensed data) to the severity database, the autonomous vehicle is able to identify or select a severity level (or, in some cases, directly identify a priority score). The severity level data and/or the priority score data may be included in a maintenance request and transmitted to an external maintenance entity.

S210 is preferably performed at least in part by the onboard computer of an autonomous vehicle, but may additionally or alternatively be performed by any computer system. For example, S210 may include capturing sensor data and performing initial analysis of sensor data at a vehicle's onboard computer, and sending the resulting analysis to a cloud-operated vehicle platform for further analysis (and potential detection of maintenance needs).

S220 includes transmitting a maintenance request. S220 functions to transmit a maintenance request on behalf of an autonomous vehicle to a maintenance entity (or to any intermediary; e.g., a remote autonomous vehicle platform).

S220 preferably includes transmitting maintenance request data with the request, which may include any relevant information regarding one or more maintenance needs; for example, the type of need, the severity of need, actions needed to address the need, the error or service codes associated with the maintenance need, the location of the autonomous vehicle, the time of need detection, whether the autonomous vehicle is currently performing a route for a passenger and/or will be performing one or more routes for passengers, or any other suitable information that can assist a maintenance entity or the like provide an appropriate maintenance request response for resolving the maintenance need in an efficient and timely manner.

Maintenance requests may be transmitted by autonomous vehicles to request maintenance for said vehicles, but may additionally or alternatively be transmitted by any suitable entity; e.g., one autonomous vehicle may transmit a maintenance request for another. Maintenance requests are preferably transmitted automatically in response to detection or prediction of maintenance needs, but may additionally or alternatively be transmitted at any time, for any reason.

S230 includes scheduling a maintenance session. Either the autonomous vehicle or an entity receiving the transmission of the maintenance request may schedule a maintenance session based on the maintenance request. S230 functions to identify an appropriate time and location for a maintenance session (e.g., a session in which one or more maintenance needs are addressed). Additionally, S230 may function to identify an appropriate maintenance entity for the maintenance session, a duration of the maintenance session, and the like.

In traditional vehicle maintenance scheduling, a vehicle owner would be obligated to find a time when the owner was available to take the vehicle in for servicing; further, this time must align with a time in which a vehicle servicer is available to perform service. Thus, there may be some difficulty in attempts to align the schedules of two disparate entities (e.g., the vehicle owner and vehicle servicer) for the purpose of scheduling maintenance for a vehicle.

S230 enables autonomous vehicles to automatically schedule (and receive) maintenance at times that are convenient to autonomous vehicle owners and/or users, as well as vehicle maintenance providers. Even for a system of independently owned and controlled autonomous vehicles and service providers, this is a significant technical advantage, huge convenience, and safety advantage (the ability to receive maintenance automatically could greatly reduce the time of rollout for safety recalls, for instance).

In scenarios in which a fleet of autonomous vehicles are coordinated by a central entity (e.g., a ridesharing operator), this advantage becomes even greater; vehicles may be automatically routed and/or otherwise controlled to reduce downtime across the fleet. Likewise, scenarios in which service providers cooperate, the aforementioned routing coordination could also be used to balance service loads across a number of service providers (and even segregate different types of service), resulting in dramatic efficiency increases.

Finally, a number of common maintenance tasks (e.g., vehicle cleaning) could be performed by mobile maintenance entities. Use of a mobile maintenance entity could again increase efficiency and decrease down-time by loosening geographical constraints on where an autonomous vehicle can be serviced; for example, a set of cleaning vehicles could clean autonomous vehicles while parked. As another example, a routing coordination system with knowledge of a number of autonomous vehicle routes and control of cleaning vehicle routes could optimize said cleaning vehicle routes for efficiently intersecting (in time and space) with autonomous vehicles to perform maintenance tasks.

S230 preferably includes scheduling maintenance in response to data received from a maintenance request (e.g., maintenance type, maintenance severity, etc.) but may additionally or alternatively schedule maintenance in response to any suitable request for maintenance.

S230 may include scheduling maintenance sessions based on vehicle location data, vehicle use schedule data, vehicle occupancy data, service availability data, service location data, and/or any other suitable data. For example, in some embodiments, the maintenance schedule for an autonomous vehicle is generated based on identifying: a location of one or more route paths of the autonomous vehicle; an availability of the autonomous vehicle to interact with a maintenance entity; a determined location of the maintenance entity; and an availability of the maintenance entity, where when the maintenance entity is nearest a location or a segment of the one or more route paths of the autonomous vehicle and the availability of the autonomous vehicle overlaps the availability of the maintenance entity, the maintenance schedule is generated such that the maintenance session is performed when the availability of the autonomous vehicle and the availability of the nearest maintenance entity overlaps.

Vehicle location data may include any data describing the location of an autonomous vehicle (e.g., now, or in the future, using a known/scheduled driving route). Vehicle location data may additionally or alternatively include predicted vehicle location data. Predicted vehicle location data may include any data describing a predicted location of an autonomous vehicle. Predicted location data may be generated in any manner; e.g., from historical location data, from scheduled meetings/appointments in a user's calendar, etc.

Vehicle use schedule data may include any data describing when an autonomous vehicle will be in use. Vehicle use schedule data may additionally or alternatively include predicted vehicle use schedule data. Predicted vehicle use schedule data may include any data describing a predicted use schedule of an autonomous vehicle. Predicted vehicle use schedule data may be generated in any manner; e.g., from historical use data, from scheduled meetings/appointments in a user's calendar, etc. Similar to historical usage data or historical operation data of an autonomous vehicle, predicted use data of the autonomous vehicle may be used to determine predicted maintenance needs of the autonomous vehicle. For instance, if an autonomous vehicle is a vehicle in a ridesharing fleet in which the autonomous vehicle historically performs a number routes for transporting passengers or the like and historically drives a number of miles to perform the routes, these data points may be used to determine predicted usage of the autonomous vehicle. Once the predicted usage of the autonomous vehicle is determined based on these data points, the predicted usage of the autonomous vehicle may be fed into the maintenance requirement prediction algorithm to determine a predicted future maintenance requirement for the autonomous vehicle.

Service availability data may include any data describing availability of a maintenance entity (or a group of maintenance entities) to perform maintenance. Service availability data may include data describing times at which services are available, which services specifically are available at said times, and/or which entities are available to perform maintenance. Service availability data may additionally or alternatively include predicted service availability data.

Service location data may include any data describing locations of maintenance entities. Service location data for non-moving maintenance entities (e.g., service stations) is static, but service location data for mobile maintenance entities (e.g., a cleaning or charging vehicle) may be dynamic. For mobile maintenance entities, service location data may additionally or alternatively include predicted service location data (e.g., similar to predicted vehicle location data).

S230 preferably schedules maintenance at times when autonomous vehicles are not otherwise in use (e.g., are not being used to transport passengers). For example, maintenance may be scheduled for when autonomous vehicles are charging their batteries. S230 may additionally or alternatively schedule maintenance at any time. For example, maintenance may be scheduled for any time in which an autonomous vehicle is within a set distance of a service station and the vehicle is not actively transporting passengers (e.g., the vehicle may be in between dropping off a passenger and picking up a new passenger).

S230 may include batching maintenance in any manner. For example, S230 may include scheduling oil changes for a group of autonomous vehicles on the same day at the same service station, such that the service station predominantly performs a single task for that day (potentially increasing efficiency). As another example, S230 may include batching a specific type of maintenance once a shipment of parts required for that type of maintenance has arrived.

If a maintenance request may cause disruption to use of an autonomous vehicle, S230 may include attempting to ameliorate or otherwise, mitigate the disruption through substitution of an autonomous vehicle. For example, S230 may include providing a replacement vehicle to an autonomous vehicle owner while the owner's car is being maintained. In another example, if it is determined that an autonomous vehicle has an urgent or otherwise high severity level maintenance need while delivering a load or transporting a passenger, it is possible to dispatch a substitute autonomous vehicle or the like to complete the delivery or transportation such that the disruption in the task or work being performed by the autonomous vehicle requiring urgent maintenance is minimal.

As previously mentioned, S230 may include allocating maintenance sessions across a group of maintaining entities. S230 may include allocating these sessions in any manner; for example, S230 may include allocating maintenance sessions to prevent any one maintenance entity from being overloaded. As another example, S230 may include allocating maintenance sessions based on maintenance bids. In this example, S230 may include transmitting maintenance proposals to a number of maintaining entities, and scheduling maintenance based on received bids to perform maintenance (e.g., S230 may include scheduling maintenance using maintenance entities that cost less than competitors). Likewise, allocations may be generated using any combination of factors (e.g., maintenance cost, degree to which maintenance entity availability overlaps with autonomous vehicle idle time, location of maintenance entity, etc.).

In scenarios in which maintenance sessions are scheduled with mobile maintenance entities, S230 may include scheduling maintenance sessions in any manner. For example, S230 may include transmitting vehicle route data to a maintenance provider, which may in turn propose maintenance sessions (e.g., including a start time, duration, and location).

Figure 3:
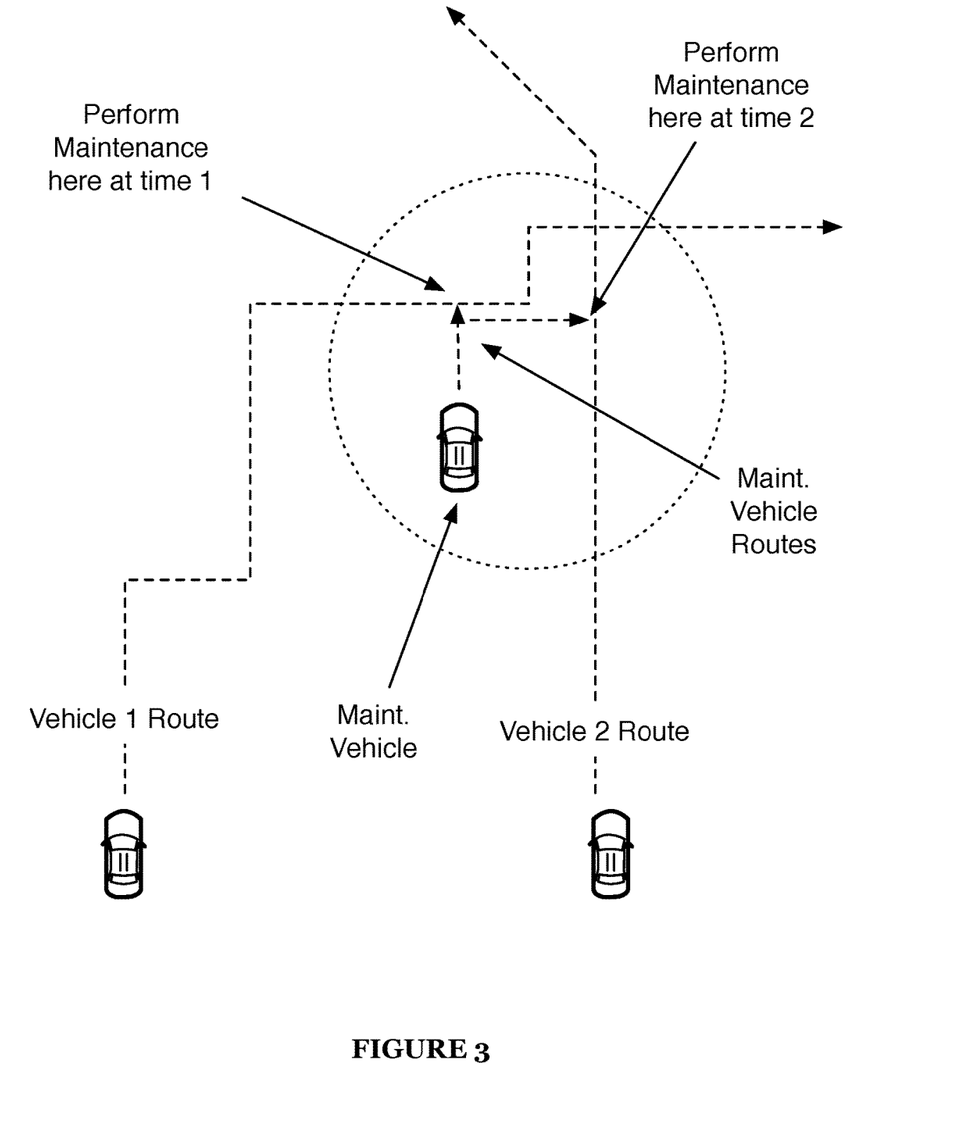
FIG. 3 is an example diagram view of maintenance entity routing.

As another example (e.g., in which maintenance vehicles are controlled by an autonomous vehicle platform), S230 may include setting maintenance vehicle routes in response to received or predicted maintenance needs. For example, maintenance vehicle sessions may be scheduled (in time and location) to reduce the need for travel by maintenance vehicles, as shown in FIG. 3.

Figure 4:
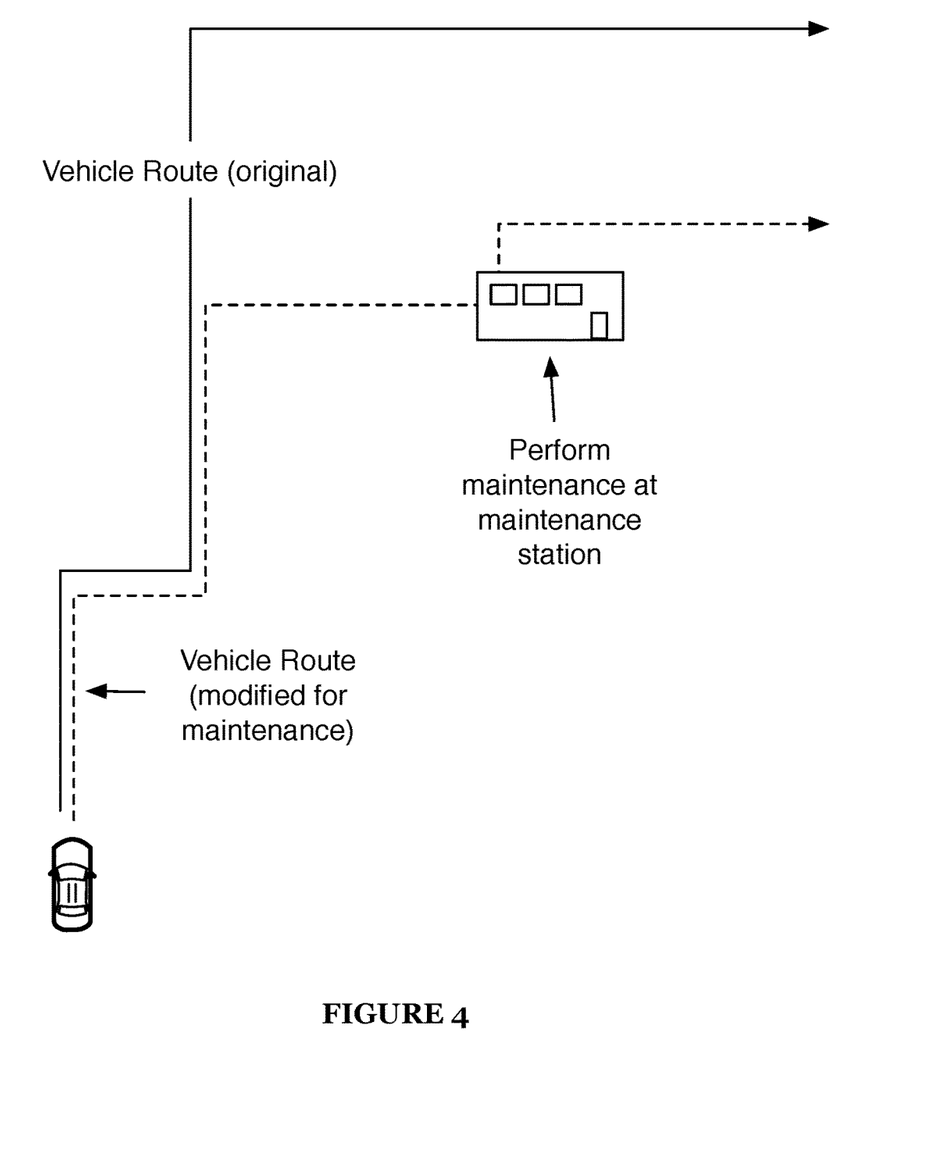
FIG. 4 is an example diagram view of autonomous vehicle routing.
Figure 5:
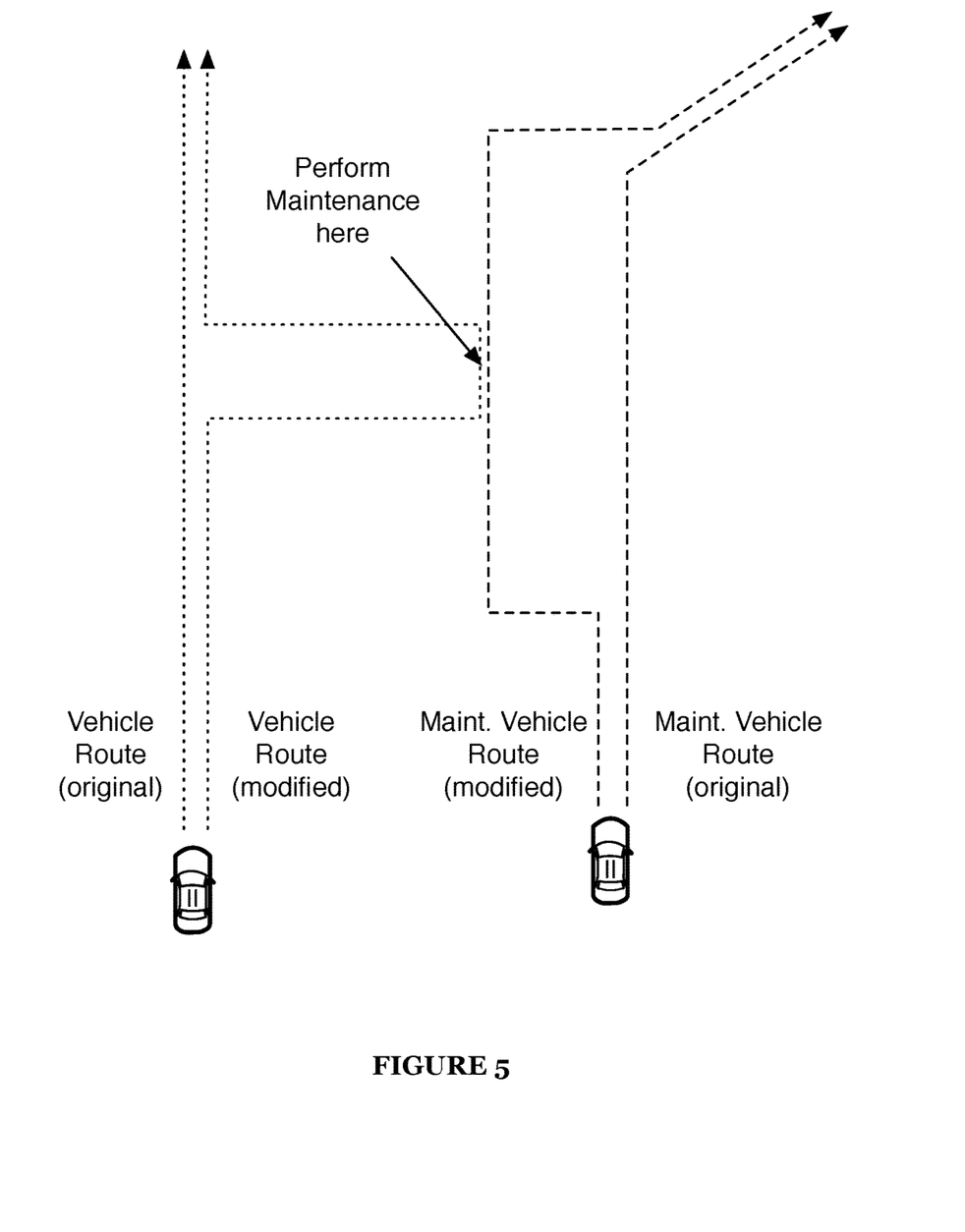
FIG. 5 is an example diagram view of maintenance entity and autonomous vehicle routing.

Additionally or alternatively, S230 may include modifying autonomous vehicle routes in response to scheduling maintenance sessions, as shown in FIG. 4. Likewise, S230 may include modifying routes of both autonomous vehicles and maintenance vehicles, as shown in FIG. 5.

S230 may accomplish route modification of autonomous vehicles (and/or of maintenance vehicles) in any manner. In one implementation of a preferred embodiment, S230 includes generating routing goals based on maintenance needs (and potentially other relevant data; e.g., maintenance entity schedules) and performing route generation or modification for autonomous vehicles and/or maintenance vehicles as described in U.S. Provisional Patent Application No. 62/302,874.

S240 includes completing maintenance. S240 functions to perform maintenance identified in a maintenance need; S240 preferably includes completing all maintenance as requested or desired, but may additionally or alternatively include completing any amount of maintenance.

Maintenance completed by S240 is preferably identified in response to detected maintenance needs and/or maintenance requests, but may additionally or alternatively be identified in any manner. For example, a maintenance session may be scheduled in S230 simply to identify maintenance issues (e.g., through inspection by a mechanic), and S240 may include completing maintenance identified in that session.

S240 may include completing maintenance in any manner. For example, S240 may include providing instructions to a mechanic or cleaner to perform a maintenance task. Additionally or alternatively, S240 may include controlling a robot (e.g., a cleaning robot) to maintain an autonomous vehicle.

S240 may additionally or alternatively include verifying that maintenance has been completed (e.g., via a remote expert, via another autonomous vehicle, via human inspection, via autonomous vehicle passenger feedback).

S240 may additionally or alternatively include performing newly identified our routine maintenance in addition to identified maintenance needs. For example, wiper fluid and battery reserves may be replenished whenever a car is maintained (e.g., via fluid replacement and battery charging respectively).

S240 may additionally or alternatively include paying for maintenance.

The method of the preferred embodiment and variations thereof can be embodied and/or implemented at least in part as a machine configured to receive a computer-readable medium storing computer-readable instructions. The instructions are preferably executed by computer-executable components preferably integrated with a system for automatic maintenance of autonomous vehicles. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for automatically detecting and performing maintenance of an autonomous vehicle, the system comprising:
   an autonomous vehicle comprising one or more sensors that obtain maintenance data regarding one or more systems or physical characteristics of the autonomous vehicle,
   wherein the autonomous vehicle is configured to:
      analyze the maintenance data to identify whether a maintenance need for the autonomous vehicle exists;
      generate a maintenance request based on identifying the maintenance need;
      transmit the maintenance request to an external maintenance entity capable of assisting the autonomous vehicle with the maintenance request; and
      receive maintenance routing instructions for directing the autonomous vehicle to a maintenance location for servicing the maintenance need; and
   a maintenance coordinator associated with the external maintenance entity that is configured to:
      receive the maintenance request;
      analyze the maintenance request and coordinate the maintenance location for the autonomous vehicle and the external maintenance entity; and
      communicate the maintenance location and the routing instructions to the autonomous vehicle.

2. The system of claim 1, wherein the maintenance request comprises:
   a description of the maintenance need, wherein the description of the maintenance need comprises one or more of an error message, an error code, an image of one or more components of the autonomous vehicle, and sensor data that triggered the maintenance need.

3. The system of claim 2, wherein the maintenance request further comprises a severity level selected from a plurality of severity levels in a maintenance severity continuum, wherein the severity level is used to determine a priority for responding to the maintenance request.

4. The system of claim 3, wherein the maintenance coordinator is a remote server configured to receive and process maintenance requests from a fleet of autonomous vehicles to generate maintenance routing instructions for each of the maintenance requests, and wherein the maintenance entity performs one or more operations for servicing the maintenance need.

5. The system of claim 1, further comprising:
   a maintenance station that is configured to receive the autonomous vehicle having the maintenance need and attempt to resolve the maintenance need, wherein the maintenance routing instructions comprises routing instructions that direct the autonomous vehicle to the maintenance station for servicing the maintenance need.

6. A method for automatic maintenance of an autonomous vehicle, the method comprising:
   identifying a maintenance requirement for an autonomous vehicle, wherein identifying a maintenance requirement includes using one or more sensors to obtain vehicle maintenance data;
   in response to identifying the maintenance requirement, generating a maintenance request comprising a description or data relating to the maintenance requirement;
   in response to the maintenance request, receiving maintenance instructions comprising a maintenance location, maintenance routing instructions and a maintenance schedule for a maintenance session for resolving the maintenance requirement; and
   controlling the autonomous vehicle to obtain the automatic maintenance based on the maintenance instructions.

7. The method of claim 6, wherein identifying a maintenance requirement includes:
   comparing the obtained vehicle maintenance data to one or more predetermined sensor data profiles for one or more components of the vehicle, wherein each the one or more predetermined sensor data profiles include data relating to a normal operating range or normal operating data for a feature or component of the autonomous vehicle; and
   detecting a potential maintenance requirement (1) when the obtained vehicle maintenance data is outside a normal operating range for a component or feature of the autonomous vehicle or (2) when the obtained vehicle maintenance data does not match normal operation data for a feature or a component of the autonomous vehicle, wherein when the maintenance requirement is detected the maintenance request further comprises results of the comparison causing the maintenance requirement.

8. The method of claim 6, wherein the maintenance routing instructions are generated based on identifying a location of the autonomous vehicle and identifying a location of a nearest available maintenance station or maintenance entity, wherein the maintenance routing instructions include routing instructions that allow the autonomous vehicle to interact with the maintenance station or the maintenance entity for purposes of servicing the maintenance requirement.

9. The method of claim 6, wherein the maintenance schedule is generated based on identifying:
   (i) a location or one or more route paths of the autonomous vehicle,
   (ii) an availability of the autonomous vehicle to interact with a maintenance entity,
   (iii) a location of the maintenance entity, and
   (iv) an availability of the maintenance entity,
   (v) wherein when the maintenance entity is nearest a location or a segment of the one or more route paths of the autonomous vehicle and the availability of the autonomous vehicle overlaps the availability of the maintenance entity, the maintenance schedule is generated such that the maintenance session is performed when the availability of the autonomous vehicle and the availability of the maintenance entity overlaps.

10. The method of claim 6, further comprising:
   in response to generating maintenance instructions for the autonomous vehicle, dispatching a mobile maintenance entity for servicing the maintenance requirement of the autonomous vehicle, wherein dispatching the mobile maintenance entity includes:
      providing a location or future location of the autonomous vehicle or providing routing instructions to the mobile maintenance entity for traveling to the location or the future location of the autonomous vehicle,
      providing a maintenance servicing need or maintenance servicing instructions to the mobile maintenance entity, wherein the maintenance servicing need describes the maintenance requirement of the autonomous vehicle, and wherein the maintenance servicing instructions include instructions for resolving the maintenance requirement of the autonomous vehicle.

11. The method of claim 6, wherein identifying the maintenance requirement comprises predicting a future maintenance requirement based on the vehicle maintenance data obtained by the one or more sensors, wherein predicting the future maintenance requirement includes:
   analyzing the vehicle maintenance data to identify sensor data associated with one or more components or characteristics of the autonomous vehicle that have an associated maintenance prediction schedule in a maintenance requirement prediction database;
   comparing sensor data from the vehicle maintenance data associated with the one or more components or characteristics of the autonomous vehicle that have the associated maintenance prediction schedule; and
   predicting one or more future maintenance requirements based on results of the comparison.

12. The method of claim 11, wherein predicting the future maintenance requirement is further based on determining a predicted future usage of the autonomous vehicle based on historical operation data or historical usage of the autonomous vehicle.

13. The method of claim 6, wherein identifying the maintenance requirement comprises predicting a future maintenance requirement based on the vehicle maintenance data obtained by the one or more sensors of the autonomous vehicle, wherein predicting the future maintenance requirement includes:
   applying a maintenance requirement prediction algorithm to the vehicle maintenance data obtained by the one or more sensors of the autonomous vehicle, wherein applying the maintenance requirement prediction algorithm includes:
      identifying from the vehicle maintenance data one or more sensor values associated with a component of the autonomous vehicle;
      identifying historical operations data of the autonomous vehicle;
      identifying a prescribed maintenance requirements for the component of the autonomous vehicle, wherein the predetermined maintenance schedule identifies one or more component maintenance thresholds at which the component should receive maintenance servicing;
      interpolating, based on the historical operations of the autonomous vehicle and the prescribed maintenance requirements for the component, future sensor values for the component up to at least one of the one or more component maintenance thresholds;
      identifying an interpolated future sensor value for the component that is nearest or intersects the at least one of the one or more component maintenance thresholds; and
      identifying a future date or future date range associated with the interpolated future sensor value, wherein generating the predicted future maintenance requirement is based on identifying the future date or the future date range at which the interpolated future sensor value is nearest or intersects the at least one of the one or more component maintenance thresholds.

14. The method of claim 6, further comprising:
   identifying that the autonomous vehicle is performing a predetermined task;
   dispatching a substitute autonomous vehicle to complete the predetermined task of the autonomous vehicle if the maintenance requirement renders the autonomous vehicle unable perform the predetermined task; and
   providing the substitute autonomous vehicle with routing instructions associated with the predetermined task.

15. The method of claim 6, wherein identifying the maintenance requirement is performed by a second autonomous vehicle using the one or more sensors to obtain data relating to one or more of a behavior of the autonomous vehicle and external characteristics of the autonomous vehicle.

16. The method of claim 6, further comprising:
   in response to generating the maintenance requirement, dispatching a replacement autonomous vehicle to perform or complete one or more routing instructions assigned to the autonomous vehicle.

17. The method of claim 6, further comprising:
   identifying a severity level selected from a plurality of severity levels in a maintenance severity continuum, wherein the severity level is used to determine a priority for responding to the maintenance request, wherein dispatching the replacement autonomous vehicle is based on the severity level selected from the plurality of severity levels.

18. The method of claim 6, wherein transmitting the maintenance request comprises transmitting the maintenance request to a maintenance coordinator or a maintenance entity, wherein the maintenance coordinator is a remote server configured to receive and process maintenance requests from a fleet of autonomous vehicles to generate maintenance routing instructions for each of the maintenance requests, and wherein the maintenance entity performs one or more operations for servicing the maintenance requirement.

19. The method of claim 6, wherein the maintenance routing instructions comprising instructions for routing the autonomous vehicle to a maintenance station for servicing the maintenance requirement, wherein the maintenance station is configured to receive the autonomous vehicle having the maintenance requirement and attempt to resolve the maintenance requirement.

20. A method for implementing a maintenance scheme for an autonomous vehicle, the method comprising:
- identifying a maintenance requirement for an autonomous vehicle based on sensor data;
- generating a maintenance request comprising a description or data relating to the maintenance requirement;
- transmitting the maintenance request to an external entity;
- in response to the maintenance request, receiving maintenance instructions from the external entity comprising a maintenance schedule and a maintenance location for servicing the maintenance requirements of the autonomous vehicle; and
- implementing the maintenance instructions.

* * * * *